March 13, 1962 G. W. RUCK ET AL 3,024,987

ZERO RESET REGISTER

Filed Nov. 13, 1958 7 Sheets-Sheet 1

INVENTORS
GEORGE W. RUCK
ALBERT S. WHEELBARGER

Strauch, Nolan & Neale
ATTORNEYS

March 13, 1962

G. W. RUCK ET AL 3,024,987

ZERO RESET REGISTER

Filed Nov. 13, 1958

7 Sheets-Sheet 2

INVENTORS
GEORGE W. RUCK
ALBERT S. WHEELBARGER

BY Strauch, Nolan + Neale

ATTORNEYS

March 13, 1962 G. W. RUCK ET AL 3,024,987
ZERO RESET REGISTER
Filed Nov. 13, 1958 7 Sheets-Sheet 3
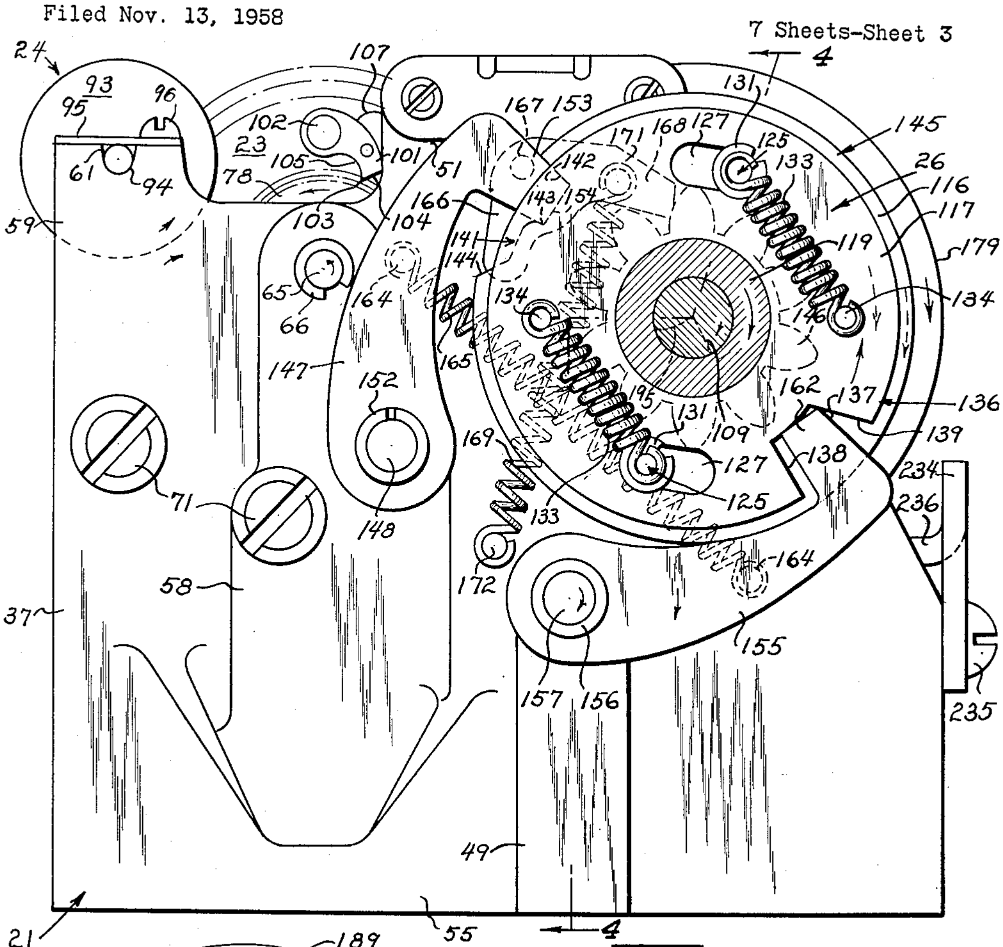
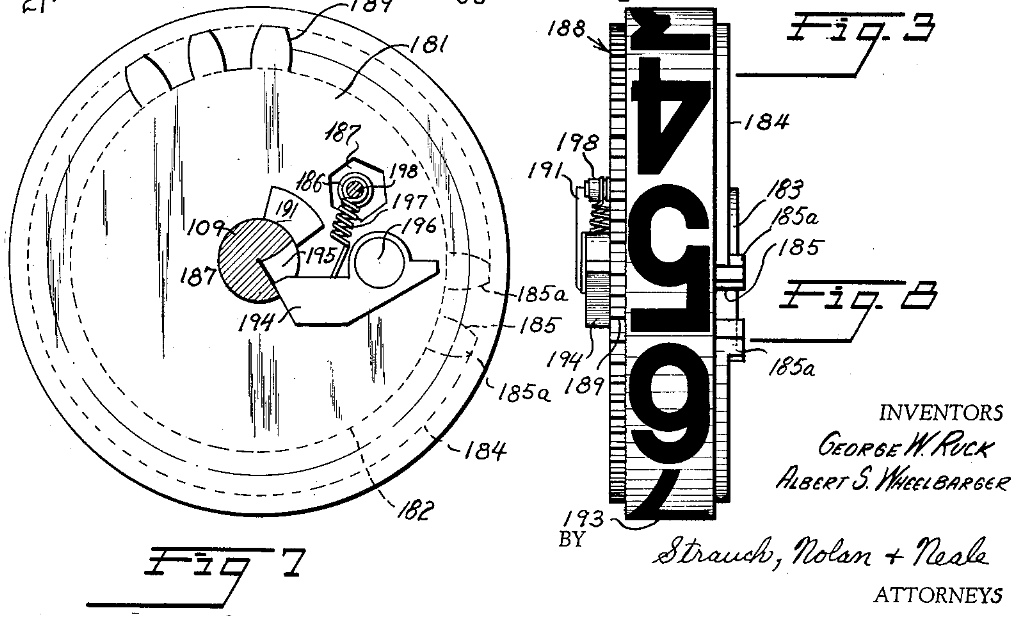
FIG. 3, FIG. 8
FIG. 7
INVENTORS
George W. Ruck
Albert S. Wheelbarger
BY Strauch, Nolan + Neale
ATTORNEYS March 13, 1962 G. W. RUCK ET AL 3,024,987

ZERO RESET REGISTER

Filed Nov. 13, 1958 7 Sheets-Sheet 4

INVENTORS
George W. Ruck
Albert S. Wheelbarger

BY Strauch, Nolan & Neale

ATTORNEYS

March 13, 1962 G. W. RUCK ET AL 3,024,987

ZERO RESET REGISTER

Filed Nov. 13, 1958 7 Sheets-Sheet 5

INVENTORS
GEORGE W. RUCK
ALBERT S. WHEELBARGER

BY Strauch, Nolan & Neale
ATTORNEYS

INVENTORS
GEORGE W. RUCK
ALBERT S. WHEELBARGER
BY
Strauch, Nolan & Neale
ATTORNEYS March 13, 1962 G. W. RUCK ET AL 3,024,987

ZERO RESET REGISTER

Filed Nov. 13, 1958 7 Sheets-Sheet 7

INVENTORS
GEORGE W. RUCK
ALBERT S. WHEELBARGER
BY Strauch, Nolan & Neale
ATTORNEYS 3,024,987

ZERO RESET REGISTER

George W. Ruck, Bethel Park, and Albert S. Wheelbarger, Pittsburgh, Pa., assignors to Rockwell Manufacturing Company, Pittsburgh, Pa., a corporation of Pennsylvania Filed Nov. 13, 1958, Ser. No. 773,594
15 Claims. (Cl. 235—144)

The present invention relates to totalizing and resettable counter fluid delivery registers adapted for use with petroleum or like dispensing meters and more particularly to an improved and simplified zero reset mechanism therefor.

Zero reset registers of the general type here involved have been previously proposed and used. Examples of such prior registers are shown in United States Letters Patent 468,329 issued February 9, 1892, to C. Carr, 1,875,060 issued August 30, 1932, to R. B. Long and 2,140,839 issued December 20, 1938, to M. M. Hennesy, These prior structures, however, do not suggest the particular cam arrangement to first disengage the carryover pinions and thereafter reset the register wheels under control of a single time delay reset wheel assuring disengagement of the carryover pinions and the drive to the register wheels and thereafter initiation of resetting movement of the register wheels.

It, accordingly, is a primary object of the present invention to provide a simple and effective single wheel reset mechanism for effecting disengagement of the register wheel carryover pinions and the drive connection to the register wheels and sequential resetting movement of the register wheels and reengagement of the carryover pinions and drive connection.

A further important object of the present invention resides in providing a totalizing and resettable counter fluid delivery register with a single reset hand wheel adapted upon initial resetting movement to effect disengagement of the resettable register wheel carryover pinions and braking of the resettable register wheels and carryover pinions and upon continued resetting movement to effect resetting of the resettable register wheels and overrunning movement of the resettable register wheel drive gear with respect to the main drive gear train.

Still another object of the present invention is to provide a totalizing and resettable counter fluid delivery register having a normally stationary reset shaft carrying the resettable register wheels with a two part reset hand wheel structure one element of which is journalled on the reset shaft and the other element of which is fixed to the reset shaft and connected to the one element through a lost motion connection permitting initial relative movement of the parts of the reset hand wheel structure to disengage the resettable register wheel carryover pinions and brake the resettable register wheels and their carryover pinions and subsequent unitary movement to effect resetting of the resettable register wheels.

A further object of the present invention is to provide the two part reset hand wheel structure of the previous object with biasing means arranged to effect retrograde relative movement of the parts of the reset hand wheel structure to restore the parts to their normal position.

Another object of the present invention resides in providing a totalizing and resettable counter fluid delivery register with a reset shaft and reset hand wheel assembly wherein the resettable register wheels and the main drive gear therefor are journalled in side-by-side juxtaposition on the reset shaft and the main drive gear and the immediately adjacent resettable register wheel are pin connected for unitary rotational movement around the reset shaft.

Further objects will appear from the following description and appended claims when read in conjunction with the accompanying drawings wherein:

FIGURE 3 is a left end elevational view of the meter register of FIGURE 1;

FIGURE 7 is a side elevttional view of the hundreds drum assembly employed in the meter register of FIGURES 1–6 viewed from the right in FIGURE 4;

FIGURE 8 is an elevational view of the hundreds drum assembly of FIGURE 7 as viewed from the rear of FIGURE 6;

Figure 11:
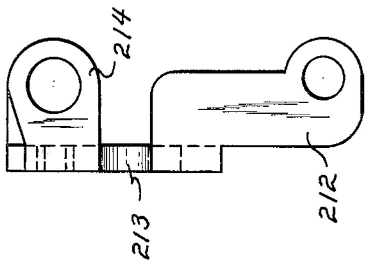
Figure 10:
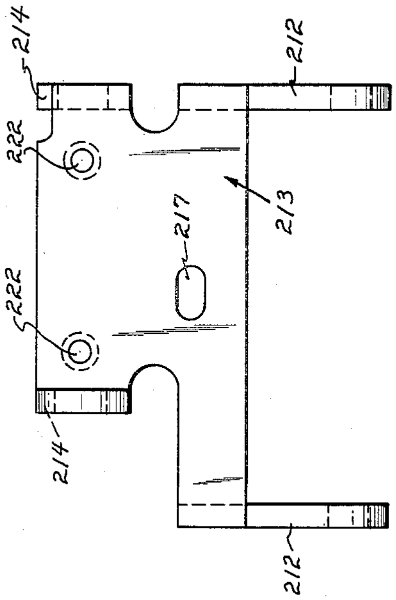
Figure 9:
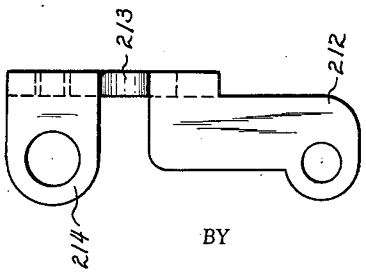

FIGURES 9, 10 and 11 are respectively left end elevational, plan elevational and right end elevational views of the transfer pinion frame employed in the meter register of FIGURES 1 through 6; and FIGURES 12, 13, 14, 15 and 16 are respectively right end elevational, rear elevational, left end elevational, top plan and front elevational views of the main meter register frame employed in the illustrated embodiment of the present invention.

With continued reference to the drawings wherein like reference numerals are employed throughout to indicate the same parts, numeral 20 generally designates a preferred form of reset register made in accord with the present invention. Reset register 20 comprises a generally U-shaped body casting 21 detailed in FIGURES 12 through 16, an input shaft assembly 22 drivingly connected at its lower end in any suitable manner to a metering element (not shown), a main drive shaft assembly 23, a non-resettable totalizer drum shaft assembly 24 driven by main drive shaft assembly 23 through an idler gear 25, a resettable counter drum shaft assembly 26, a transfer pinion shaft assembly 27, a support assembly 28 carrying the transfer pinion shaft assembly 27 and counter drum braking mechanism 29 and a transfer pinion braking mechanism 42.

Figure 5:
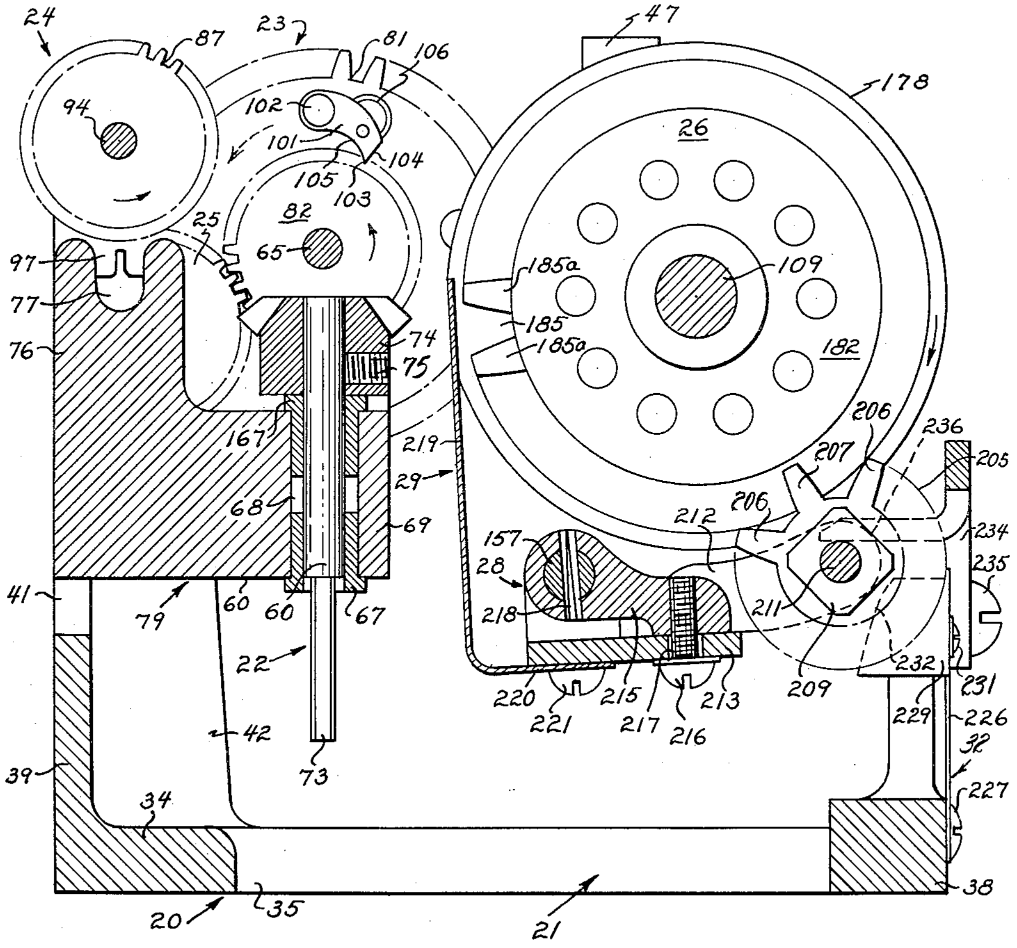
FIGURE 5 is a transverse sectional view taken substantially on line 5—5 of FIGURE 1 looking in the direction of the arrows.
Figures 12, 13:
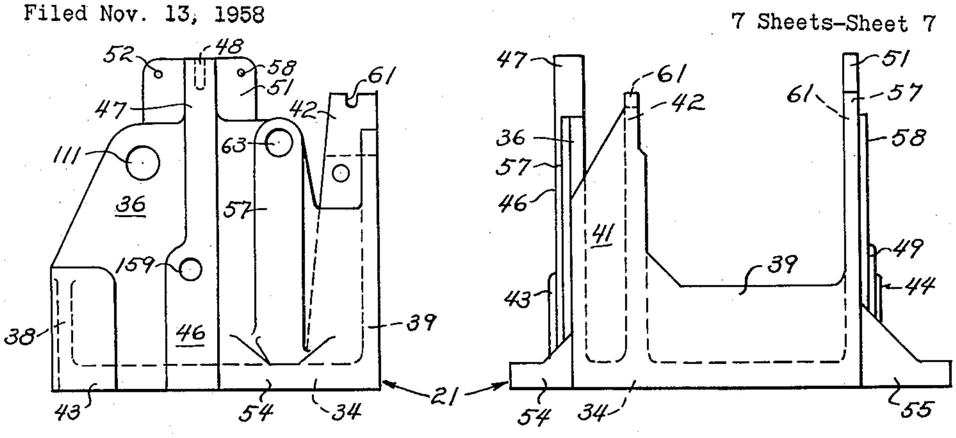
Figure 16:
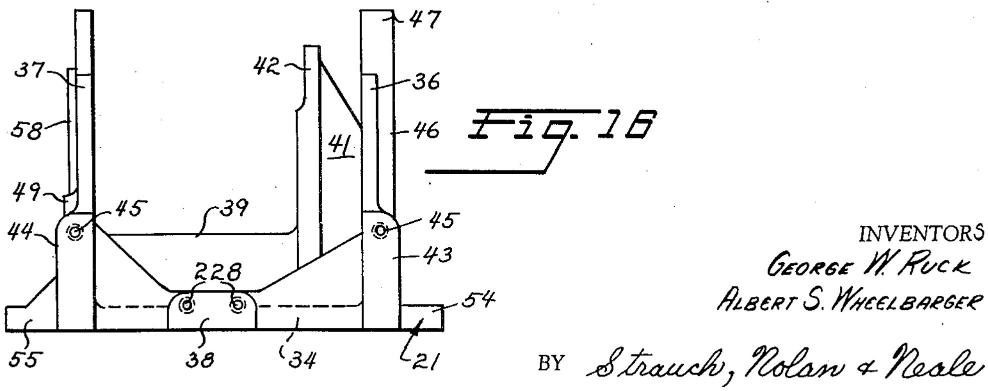

Referring for the moment to body casting 21 and particularly to FIGURES 12 through 16, the body casting comprises a plate-like base 34 having an enlarged through opening 35 therein, upstanding sidewalls 36 and 37 and foreshortened upstanding front and back walls 38 and 39. Rear wall 39 adjacent to but laterally inwardly from sidewall 36 is formed with a narrow vertically upstanding web-like wall portion 41 the inner edge of which carries a right angularly related wall segment 42 extending forwardly toward front wall 38 a short distance as best shown in FIGURES 5, 12 and 16. Sidewall 36 at its forward edge is provided with a thickened portion 43 extending upwardly about one half of its total height and a similar thickened portion 44 is formed along the forward edge of sidewall 37 in lateral alignment to thickened portion 43 of sidewall 36. The forwardly facing edges of thickened portions 43 and 44 adjacent their upper ends are provided with respective tapped apertures 45 (FIGURE 16) for a purpose to be hereinafter pointed out.

Rearwardly of thickened portion 43, sidewall 36 is provided with an outwardly protruding elongated, rib-like member 46 which extends the full height of wall 36 and a portion of which protrudes upwardly above the upper edge of wall 36 to form an upstanding post-like member 47 (FIGURES 5, 12, 13 and 17). The upper end of member 47 is provided with a tapped opening 48 the purpose of which will be hereinafter pointed out.

Figure 14:
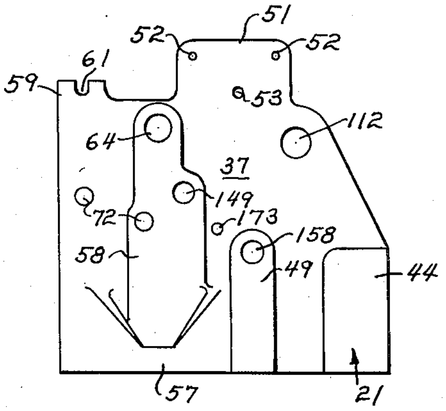
Figure 15:
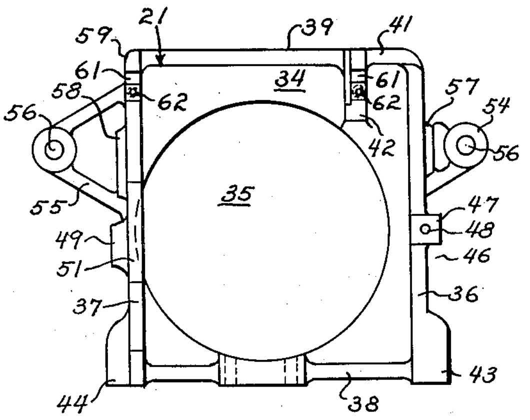

Sidewall 37 in substantially opposed centered relation to rib-like member 46 is provided on its outer face with a similar rib-like member 49 terminating about midway of its height (FIGURES 3 and 14). The upper edge of sidewall 37 in substantially opposed centered relation to post-like member 47 of sidewall 36 is formed with an upstanding wall formation 51 having forwardly and rearwardly spaced tapped openings 52 and a through bore 53 therein (FIGURES 12 and 14) the purpose of which will presently appear.

Both sidewalls 36 and 37 adjacent their rearmost edges and in the plane of base plate 34 are provided with laterally protruding securing pads 54 and 55 respectively for mounting the reset register on the meter (not shown) with which it is to be associated. Each of these mounting pads is provided with a through opening 56 adapted to receive a suitable mounting bolt (not shown). Each of the sidewalls 36 and 37 is further provided in generally centered relation to the through openings 56 with further rib-like protruding members 57 and 58 on their outer faces extending from the upper surfaces of pads 54 and 55 upwardly to the top wall edges. Sidewall 37 at its extreme rearmost edge is also provided with an upstanding wall formation 59 (FIGURES 1, 3, 14 and 15) in laterally opposed relation to the upper end of wall segment 42. The upper ends of wall segment 42 and wall formation 59 are respectively provided with generally U-shaped recesses 61 and the inner recess defining end faces of these wall elements are each provided with a tapped opening 62 (FIGURE 15) for a purpose to be presently pointed out.

Figure 1:
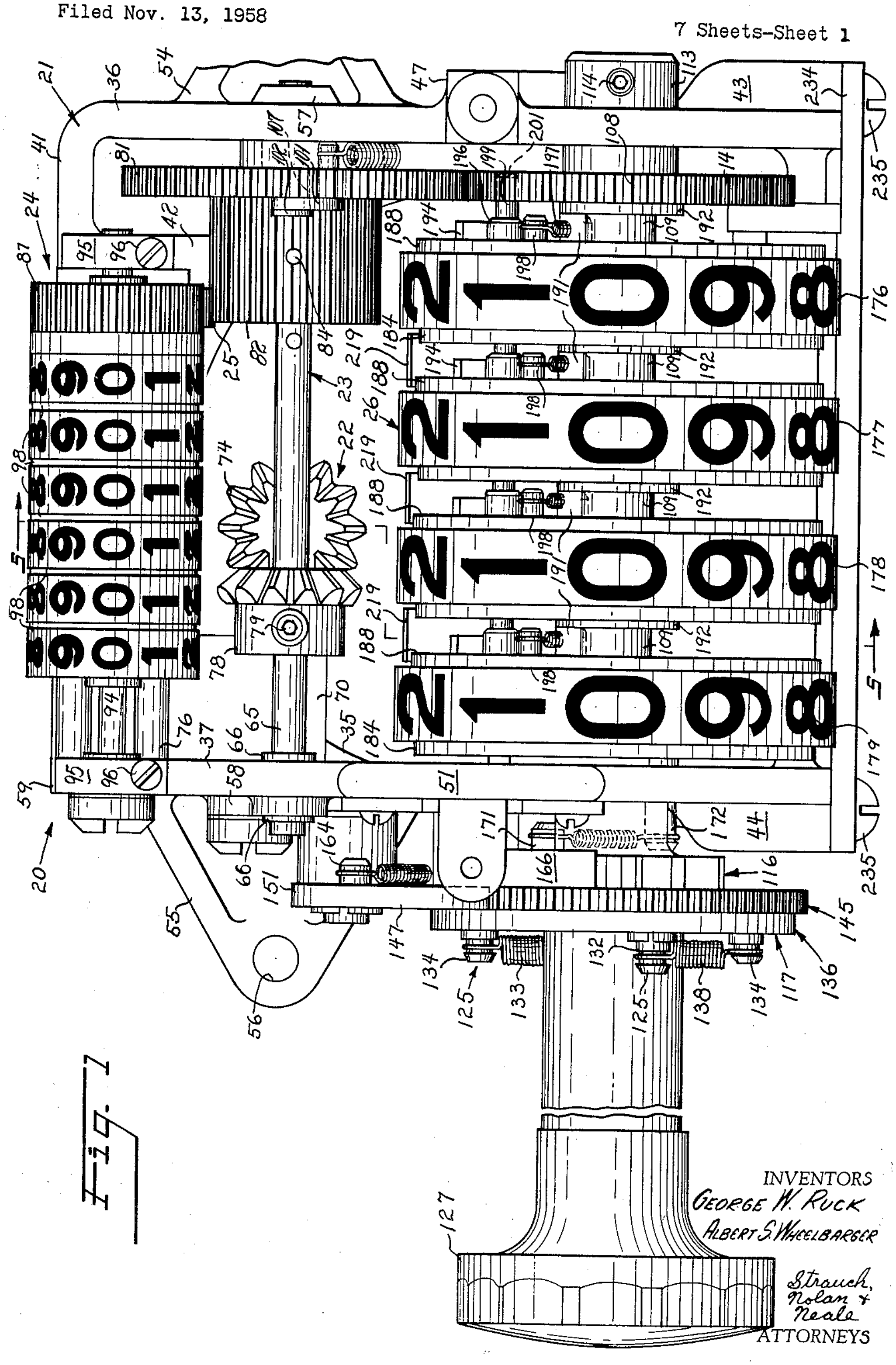
FIGURE 1 is a top plan view of a preferred embodiment of a meter register embodying the improvements of the present invention.

Sidewalls 36 and 37 adjacent the upper ends of their respective rib-like members 57 and 58 are provided with oppositely aligned through openings 63 and 64 (FIGURES 12 and 14) adapted to journal the opposite ends of main drive shaft 65 of main drive shaft assembly 23. As best seen in FIGURES 1 and 3, the end of shaft 65 supported in sidewall 37 is provided with snap rings 66 to secure it against axial movement relative to sidewalls 36 and 37. Shaft 65, as will be clear from FIGURES 1 and 5, extends laterally between sidewalls 36 and 37 with its axis intersecting at right angles the upward extension of the axis of the input shaft 60 of input shaft assembly 22. As most clearly appears from FIGURES 1 and 5, the input shaft 60 is journalled in upper and lower sleeve bearings 67 disposed in the opposite ends of a vertical bore 68 formed in a boss 69 of a guide block 70 bolted to sidewall 37 by machine screws 71 (FIGURE 3) passing through apertures 72 (FIGURE 14) formed in sidewall 37. The lower end 73 of shaft 60 depends below boss 69 and is reduced in diameter and non-circular in cross-section to adapt it for ready driving connection to the metering element of the meter with which the register is associated. At its upper end shaft 60 non-rotatably mounts a bevel drive pinion 74 secured to the shaft by a suitable set screw 75 or other suitable means. Guide block 70 at its uppermost rear corner is provided with a laterally extending leg 76 (FIGURES 1 and 2) having an upwardly opening recess 77 extending from end-to-end of leg 76 and the width of block 70 and laterally of body casting 21. The purpose of this recess will be hereinafter pointed out.

Shaft 65 of drive shaft assembly 23, non-rotatably mounts a driven bevel gear 78 in meshing engagement with drive pinion 74 a suitable set screw 79 being provided to permit axial adjustment of gear 78 along shaft 65 to assure proper meshing engagement of the two bevel gears. Shaft 65 immediately adjacent the inner face of sidewall 36 has a pawl driven counter drive gear 81 journalled thereon and the assembly 23 is completed by securing to shaft 65 immediately adjacent the exposed face of gear 81 a combined totalizer drive and ratchet gear 82. While any suitable means may be employed to fix gear 82 to shaft 65, the present invention contemplates the provision of a pin 84 drive fitted into aligned radial holes in the gear 82 and shaft 65.

Combined totalizer drive and ratchet gear 81 constantly meshingly engages idler gear 25 journalled on a stub shaft 85 (FIGURE 2) fixedly mounted in the wall segment 42 provided adjacent sidewall 36. Gear 25 is preferably secured against axial movement off of stub shaft 85 by a snap ring 86 in well known manner. Idler gear 25 in turn constantly meshingly engages the toothed ring segment 87 of the units drum 88 of non-resettable totalizer drum shaft assembly 24. Units drum 88 and its related totalizer drums 89, 90, 91, 92 and 93 are all journalled on totalizer drum shaft 94 and drivingly related in well known manner to form a conventional unidirectionally driven digital counter. The opposite ends of totalizer drum shaft 94 are press fitted into recesses 61 of sidewall 37 and wall segment 42 and clamped in place by respective clamp plates 95 secured to the upper edges of sidewall 37 and wall segment 42 by machine screws 96 threaded into the previously described tapped openings 62. As seen from FIGURE 5, the protruding ears 97 of the conventional carry over pinion mounting plates 98 of the odometer depend into the recess 77 of guide block 70 and its laterally extending leg 76 to secure plates 98 against rotation and assure proper totalizing of the odometer.

From description so far given, it will be apparent that upon registering movement of input shaft 73 and gear 74 in a counterclockwise direction as viewed in FIGURE 1, bevel pinion 74 will always drive main drive shaft bevel gear 78 and its shaft 65 in a counterclockwise direction as viewed in FIGURES 3 and 5 causing combined totalizer drive and ratchet gear 82 secured to shaft 65 to drive idler gear 25 always in a clockwise direction and the non-resettable totalizer drums in a counterclockwise registering direction at all times. Furthermore, since gears 87, 25, 82, 78 and 74 are constantly in mesh and drivingly connected through input shaft 73 to the unidirectionally movable metering element of the associated meter, it will be apparent that reverse rotation of the non-resettable totalizer drums will be impossible unless either the non-resettable totalizer drum shaft assembly 24 is removed or the entire register is removed from the meter.

The drive to the resettable counter drum shaft assembly 24 is effected by driving pawls 101 (FIGURES 1, 3 and 5) mounted on the face of gear 81 in overhanging, radially outwardly spaced relation to combined totalizer drive and ratchet gear 82. While any desired number of pawls may be provided, two diametrically spaced pawls 101 of identical construction are preferred. Each pawl 101 is pivotally secured at one end to the face of gear 81 by a headed pivot pin 102 press fitted into a suitable aperture provided in the body of gear 81. The opposite end of each pawl 101 is in the form of a pointed nose 103 shaped to fit into the space between adjacent teeth of gear 84 and provide an abutment face 104 to abuttingly mate with the counterclockwise facing sidewalls of the teeth of gear 82 and an oppositely facing curved cam wall 105. Cam wall 105 is conventionally adapted to raise the pawls 101 from engagement with the teeth of gear 82 upon overrunning counter-clockwise rotation of gear 81 with respect to gear 82 thus providing a one way drive connection between gears 81 and 82 when gear 82 is rotated in a counterclockwise registering direction. A suitably formed biasing spring 106 secured to conventionally formed posts associated with the pawls 101 and extending through body openings 107 (FIGURE 3) in the body of gear 81 constantly urge pawls 101 toward driving engagement with the teeth of gear 82. It will be appreciated, therefore, that gear 81 will be driven in counterclockwise registering direction whenever gear 82 runs in registering direction but will be free to overrun gear 82 when the resettable counter drum shaft assembly 26 is operated as will be presently pointed out to return the resettable counter drums to their zero registering position.

Figure 4:
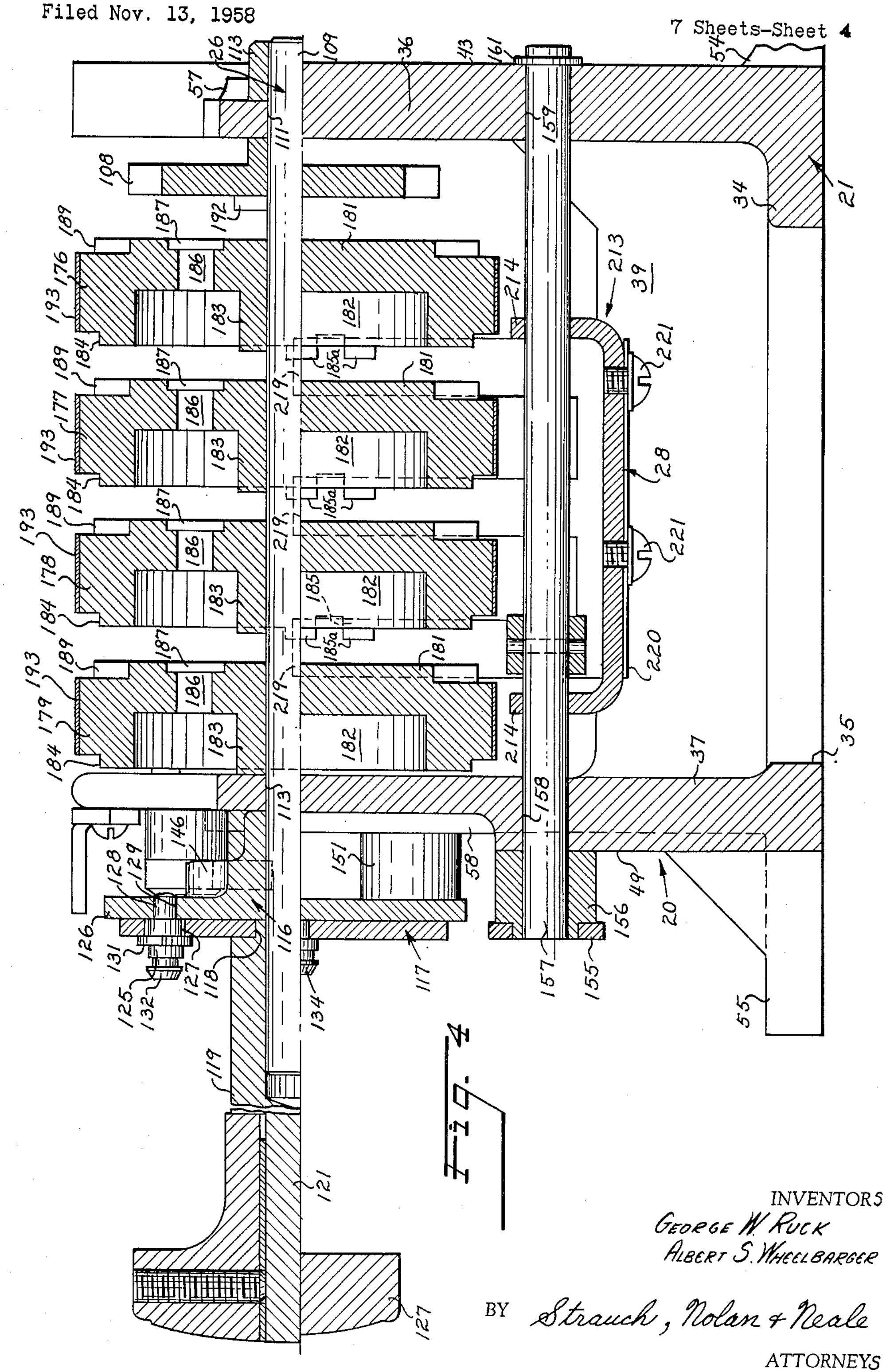
FIGURE 4 is a longitudinal sectional view taken substantially on line 4—4 of FIGURE 3 looking in the direction of the arrows.

Registering movement of the resettable counter drums of assembly 26 is effected by constantly meshing gear 81 with drum drive gear 108 (FIGURES 1 and 4) journalled on normally stationary drum shaft 109 of assembly 26. As best shown in FIGURE 4, drum shaft 109 is journalled in bores 111 and 112 respectively provided in sidewalls 36 and 37 in laterally aligned relation as will be clear from reference to FIGURES 12 and 14. The opposite ends of drum shaft 109 protrude respectively beyond the outer faces of sidewalls 36 and 37, the end protruding beyond sidewall 36 being provided with a positioning collar 113 non-rotatably fixed thereto by a set screw 114 (FIGURE 1). The end protruding beyond sidewall 37 extends a substantially greater distance than does the opposite end and mounts in succcession a combined cam and ratchet gear element 116 nonrotatably fixed to shaft 109 by means of a suitable spline type key, shear pin or the like (not shown), a reset drive cam plate 117 the centered aperture 118 of which is press fitted or otherwise fixedly secured to a hollow stub member 119 journalled on the end of shaft 109 and having an outer solid end portion 121 fixedly mounting a hand hold knob 122 adapted to be grasped by the delivery operator to reset the register. The elements 116, 117, 118 and 122 and their connecting elements to be hereinafter described may conveniently be said to form a two part reset hand wheel structure. The two part reset hand wheel structure is operatively joined together, as best seen in FIGURES 3 and 4, by diametrically opposed pins 125 the shanks 126 of which extend freely through short arcuate slots 127 formed in the body of reset cam plate 117 and terminate at one end in a longitudinally splined attachment portion 128 adapted to be drive fitted into diametrically opposed openings 129 provided in the cam body of cam and ratchet gear element 116 and split snap washers 131 snapped in conventional manner into suitable annular grooves provided in shanks 126. The opposite end 132 of each pin 125 is in the form of a spring anchor post adapted to receive one end of a respective tension spring 133 the opposite end of which is connected to a respective anchor post 134 drive fitted into apertures formed in the body of cam plate 117. Springs 133, as will be clear from a consideration of FIGURE 3, normally bias cam elements 116 and 117 in opposite directions around the axis of shaft 109 to normally seat pins 125 in the clockwise disposed or leading ends of slots 127. While the snap rings 131 and pins 125 retain cam elements against axial separation, they provide sufficient axial clearance to permit easy relative clockwise rotation of cam element 117 with respect to cam element 116 against the tension of springs 133 when it is desired to reset the resettable counter drum shaft assembly 26.

As most clearly illustrated in FIGURE 3, cam element 117 provides a peripheral cam surface 136 interrupted at one point by a single indent or pawl recess 137 the sidewall face 138 of which is disposed on a radius of the body of cam element 117 and the opposite face 139 of which is inclined to face 138 at an angle of approximately 45°. As a consequence, face 138 forms a pawl latching face while face 139 forms a pawl camming face to lift the cooperating pawl to peripheral cam face 136 as will presently appear.

Cam element 116, at a point diametrically opposite recess 137 when cam elements 116 and 117 are in their normally spring biased relative positions, is provided with a single stepped indent or pawl recess 141 the counterclockwise facing sidewall face 142 of which is disposed on a radius of the body of cam element 116 normally angularly located approximately 167° in a clockwise direction ahead of face 138 of cam element 117 to form a pawl latching face oppositely related to the latching face 138 of cam element 117. The stepped bottom wall of recess 141 is made deepest adjacent sidewall face 142 to provide a short, clockwise facing curving sidewall face 143 disposed to form a pawl interference face designed to impose a noticeable resistance to clockwise movement of cam element 116 when cam element 117 is initially rotated in a clockwise direction (FIGURE 3) by the operator. The shallower bottom wall of recess 141 merges into an opposed clockwise facing sidewall 144 disposed at an angle of approximately 72° to sidewall face 142 and forms a pawl camming face to lift the cooperating pawl to the peripheral cam face 145 of element 116 after continued rotation of cam element 117. The smaller diameter gear portion of element 116 is formed with peripherally disposed gear teeth 146 (FIGURES 3 and 4) to provide an anticlockwise rotation prevention ratchet to be hereinafter described.

Figures 2, 6:
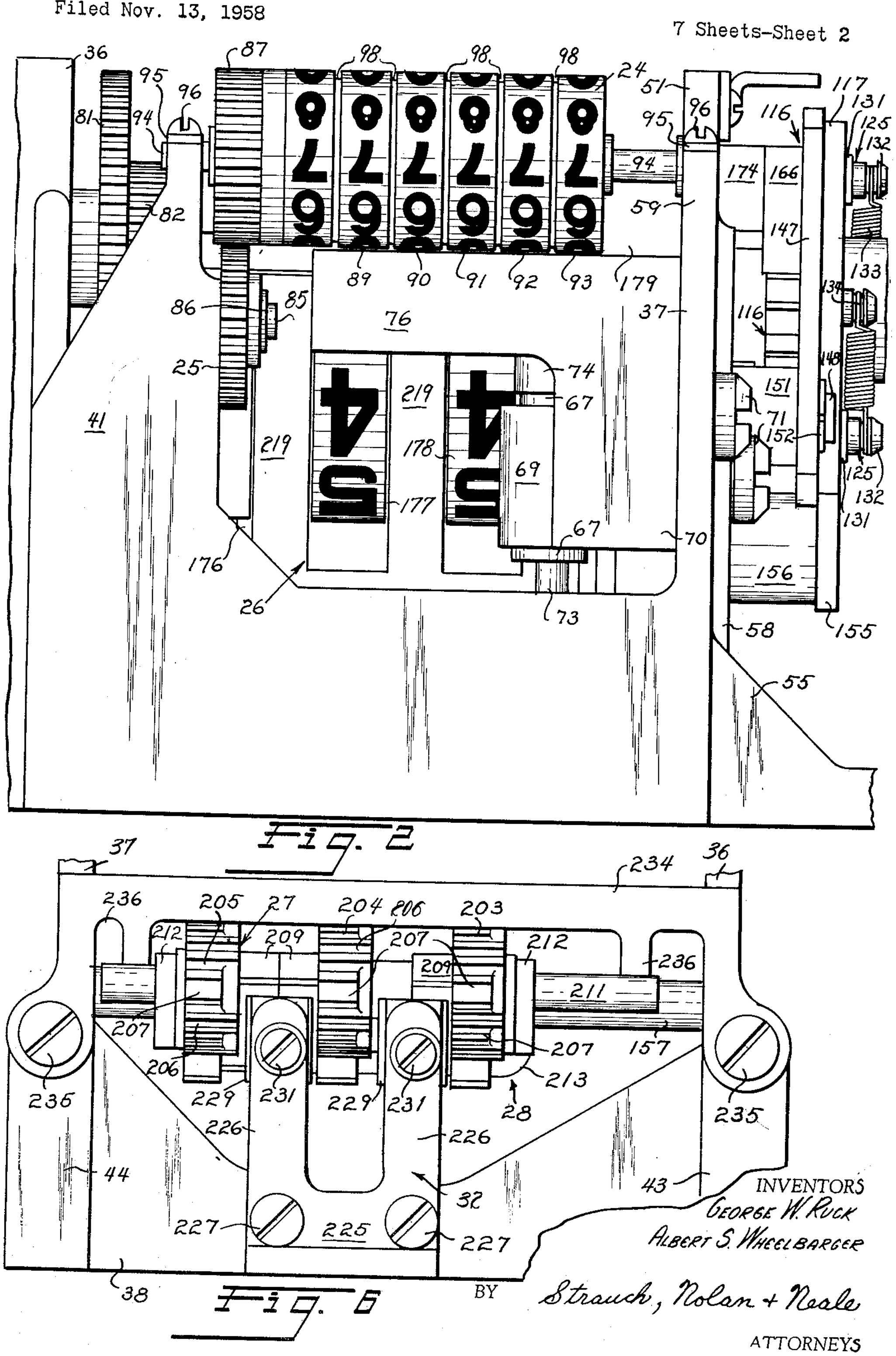
FIGURE 2 is a rear elevational view of the meter register of FIGURE 1.
FIGURE 6 is a front elevational view of the meter register of FIGURE 1 with the upper portions of the side walls and the structure carried thereby omitted.

The cooperating pawl 147 for cam and ratchet gear element 116 is journalled on a pin 148 fixedly secured in opening 149 (FIGURE 14) of sidewall 37 and comprises an axially directed hub 151 disposed in end bearing relation to rib-like member 58 of frame sidewall 37 and held against axial disassociation from pin 148 by a snap ring 152 disposed in an annular groove (not shown) provided in the periphery of pin 148 in conventional manner. The follower arm of pawl 147 is formed at the outer free end of hub 151 as best shown in FIGURES 1 and 2 to dispose it in the plane of element 116 and its free end is provided with a nose 153 (FIGURE 3) having sidewalls that converge toward and are intersected by a flat follower surface 154 adapted to ride on peripheral cam surface 145 during resetting movement of element 116.

The cooperating pawl 155 for cam element 117 is press fitted on a spacer hub 156 (FIGURE 4) fixed to the protruding end of a cross-shaft 157 journalled in opening 158 (FIGURES 4 and 14) of frame sidewall 37 and opening 159 (FIGURES 4 and 12) of frame sidewall 36 and held against relative axial movement with respect to the frame sidewalls by snap ring 161. The follower nose 162 of pawl 155 is formed in substantially the same way as the nose of pawl 147 but it will be seen from an inspection of FIGURE 3 that its width is substantially less than that of recess 137 to permit relatively free entry of nose 162 into recess 137. The respective faces of pawls 147 and 155 opposed to side wall 37 approximately midway of their length are provided with respective spring anchor posts 164 (FIGURES 1 and 3) to which the opposite ends of a tension spring 165 are connected to resiliently bias the respective pawls inwardly toward their respective cam plates.

A ratchet pawl 166 (FIGURES 1 and 3) is journalled on a pin 167 (FIGURE 3) press fitted in bore or opening 53 in frame sidewall 37. As clearly seen in FIGURE 3, pawl 166 has a ratcheting nose 168 shaped to cooperate with teeth 146 of element 116 to prevent counterclockwise rotation of element 116 and shaft 109 while permitting ratcheting clockwise movement of element 116 and shaft 109. A biasing spring 169 having one end connected to a spring anchor post 171 press fitted into pawl 166 adjacent nose 168 and its other end connected to spring anchor post 172 press fitted into opening 173 (FIGURE 14) of frame sidewall 37 resiliently forces nose 168 into engagement with ratchet teeth 146. A spacer 174 (FIGURE 2) retains pawl 166 in the plane of teeth 146 and spaced outwardly from wall 37.

Drum shaft 109 between sidewalls 36 and 37 in addition to journalling drum drive gear 108 adjacent sidewall 36 also journals a series of resettable counter drums 176, 177, 178 and 179 in side-by-side spaced relation. Each counter drum is injection molded of plastic and comprises a main body 181 (FIGURES 4, 7 and 8) having an annular recess 182 in one face surrounding a centered hub 183 of a length to protrude slightly beyond the recessed face for a purpose to be presently pointed out. The recessed face has an annular peripherally located recess defining an integral carryover gear ring 184 formed with a thickened portion 185 at one point on its periphery recessed to provide a single gear shaped recess best shown in FIGURE 7 lying between two half thickness adjacent gear tooth segments 185*a* (FIGURE 5) for cooperation with carryover pinions to be presently described. The body 181 in the area of recess 182 is provided with two through openings 186 terminating at the opposite face in hexagonal shaped recesses 187. The opposite face is also provided with an annular peripherally located recess defining an integral carryover gear ring 188 formed with a continuous series of teeth 189. The opposite face of body 181 adjacent the shaft bore is provided with an arcuate, generally wedge shaped, axially outwardly protruding lug 191 adapted to serve as a spacer and axially dimensioned to engage the end face of the opposed hub 188 of an adjacent drum or the spacing collar 192 (FIGURES 1 and 4) formed on gear 108. These spacer lugs maintain the drums and gear 108 in predetermined axially spaced relation along shaft 109 and the drum 179 has the thickened ring gear portion 185 ground off flush with the face of gear 184 so its free hub end will bear against the inner opposed face of sidewall 37. The drum indicia is preferably moulded into the rim of each drum during the ejection molding process that forms the drum.

Since drum pick-up pawls 194 are intended to respectively cooperate with an axially aligned series of reset notches 195 (FIGURES 3 and 7) formed along shaft 109 at axially spaced points located to cooperate with the respective pawls as shown in FIGURE 1, it will be appreciated that shaft 109 and combined cam and ratchet gear element 116 fixed to it must be suitably related to assure proper zero setting. This relationship is preferably established by locating the connecting pin, spline or like securing means for element 116 angularly with respect to pawl recess 141 to assure locking cooperation with pawl 147 when shaft 109 is in its normal zero position depicted in FIGURES 3 and 7. Referring to FIGURES 1 and 7, it will be seen that drum pick-up pawls 194 are journalled on journal pins 196 non-rotatably fixed in one opening 186 of each drum and biased to operative position to engage shaft notches 195 by tension springs 197 having one end connected to a respective pawl 194 and its opposite end connected to a spring anchor post 198 fixed in the other opening 186. It is to be understood that the pawls 194 are placed and biased in such a way as to cooperate with recesses 195 in shaft 109 so that the drums may turn freely over the shaft 109 in a counterclockwise direction (FIGURE 7) which is the direction that they are normally driven by the metering element. It will further be appreciated that if shaft 109 is rotated counterclockwise (FIGURE 7), it will rotate the drums through pawls 194. Referring to FIGURE 1, it will be noted that the pin 196 employed in drum 176 has an extension portion 199 protruding beyond pawl 194 and toward and into a suitable opening 201 in gear 108 to drivingly connect the drum drive gear and drums of register assembly 23.

Referring for the moment to the carryover or transfer pinions for drums 176 to 179, three pinions 203, 204 and 205 (FIGURE 6) are provided. These pinions occupy axial positions respectively between drum 176 and 177, drums 177 and 178 and drums 178 and 179. Each pinion is conventionally constructed and comprises alternating axially long teeth 206 and axially short teeth 207 (FIGURE 6) to provide constant meshing engagement with teeth 189 of drum gear rings 188 and meshing engagement between driving gear tooth segments 185*a* and the short teeth 207 of the carryover pinions once each complete revolution of the preceding register drum. Each time meshing engagement of tooth segments 185*a* and a short tooth 207 of a related carryover pinion occurs, the pinion is advanced to engage the next long tooth in recess 185 and the pinion, accordingly, is moved two steps to advance its constantly meshed drum the required distance between two peripherally adjacent indicia. Between such engagement of the tooth segments 185*a* and the short pinion teeth 207, the periphery of the respective gear rings 184 passes freely between the adjacently related long teeth 206 as seen in FIGURE 5 without imparting any movement to the respective carryover pinions. This construction is conventional and by properly relating the teeth of pinions 203, 204 and 205 to their engaged gear rings 188 the two step advancement of the successive register drums every revolution of the preceding drum will assure movement of the register drums from one numeral to the next in well known manner. Each pinion additionally includes a noncircular hub 209 for a purpose to be presently pointed out.

Pinions 203 to 205 are mounted on a common shaft 211 supported inwardly from its opposite ends in spaced support arms 212 (FIGURES 5, 6, 9, 10 and 11) of a transfer pinion frame 213 the upstanding hanger ears 214 of which are in turn journalled on shaft 157 non-rotatably mounting pawl 155 cooperating with cam element 117. Frame 213, as best shown in FIGURE 5, is bolted to a bracket member 215 by means of a cap screw 216 passing through slot 217. Bracket 215 in turn is non-rotatably secured to shaft 157 by means of a roll pin 218 or other suitable means. Frame 213 also mounts a series of three upstanding leaf spring arms 219 (FIGURES 1, 4 and 5) integrally formed on a plate member 220 secured to frame 213 by cap screws 221 threaded into suitably tapped openings 222 provided in the body of frame 213. As best seen in FIGURES 1, 4 and 5, spring arms 219 extend upwardly behind drums 176 through 179 to dispose their free upper ends in close juxtaposition to the respectively opposed gear rings 184 and 189 for a purpose to be hereinafter explained.

From the foregoing description of the carryover pinion and carryover pinion frame construction, it will be apparent that the carryover pinions swing toward and away from the registering drums along an arcuate path whose center is the axis of shaft 157 and that the free ends of spring arms 219 similarly swing toward and away from the drum gear rings in directly inverse order as pawl 155 moves in and out of its locking recess 137. Since movement of pawl 155 out of recess 137 takes place during the initial recessing movement of the reset hand wheel 127 when the lost motion connection between elements 116 and 117 is effective to prevent resetting rotation of shaft 109, it will be appreciated that resilient braking of the resettable drums by spring arms 219 occurs simultaneously with the disengagement of the carryover pinions. As a result, each drum is frictionally restrained against independent rotation during the resetting operation and a positive force applied through the engagement between pawls 194 and the associated shaft notches 195 is required to effect relative movement of the respective drums and resetting movement of the various drums to zero. As a consequence, the relation of the respective drum gear rings to each other at the time of starting the resetting operation is assured for all zeroed drums to permit proper reengagement of the carryover pinions upon conclusion of the resetting operation and all drums being reset are accurately oriented with respect to the zeroed drums when the zero reset position is reached at the conclusion of the resetting operation.

Since the drums themselves are properly oriented with respect to each other and shaft 109 by the braking force just described, it is important that the carryover pinions themselves be maintained in position during resetting to assure proper reengagement with the drum ring gears upon conclusion of the resetting operation. In the present invention, this function is effectively accomplished by resilient braking forces applied to the non-circular hubs 209 of the respective carryover pinions 203 through 205. The structure which accomplishes braking of the pinions, comprises a spring plate 225 (FIGURES 5 and 6) having a pair of upstanding spring arms 226 and secured to the front edge of frame base 34 by cap screws 227 threaded into tapped apertures 228 (FIGURE 16) formed in base 34 and the brake blocks 229 secured to the upper ends of arms 226 by cap screws 231. As best shown in FIGURE 5, blocks 229 have an arcuate face portion 232 engageable by the squared hubs of the carryover pinions as the pinions swing toward disengaged position. This engagement with blocks 229 prevents relative rotation of the respective carryover pinions and proper presentation of the carryover teeth to the drum gear rings upon engaging movement of the carryover pinions upon conclusion of each reset operation. To assure that jamming of the carryover pinions with the register drum gear rings does not occur upon engagement of the pinions and gear rings, the present invention provides a pinion shaft stop or positioning mechanism comprising a support bar 234 secured to the thickened portions 43 and 44 of frame sidewalls 36 and 37 by cap screws 235 threaded into tapped openings 45 (FIGURE 16) and integral stop tabs 236 bent at substantially right angles to bar 234. As best shown in FIGURES 5 and 6 stop tabs 236 extend inwardly into overlying abutting relation to the opposite protruding ends of carryover pinion shaft 211 to limit counterclockwise swinging movement of shaft 211 around the axis of pawl shaft 157. Minor adjustment of stop tabs 236 may readily be effected by bending them in the desired direction.

Operation of the reset mechanism of this invention, it is believed, will be clear from the foregoing description.

A summary of operation starting from a zero setting and assuming shaft 73 and gear 74 to be driven by a fluid meter in a counterclockwise direction as viewed in FIGURE 1, meshing bevel pinion 78 and its shaft 65 and totalizer drive and ratchet gear 82 will be driven in the direction of the arrow in FIGURES 3 and 5. This rotation through meshing gears 82, 25 and non-resettable totalizer drum gear 87 rotates totalizer units drum 88 to register on the non-resettable totalizer drums of assembly 24 the total gallonage of metered fluid. At the same time the teeth of gear 82 drivingly engage the ratcheting pawls 101 of resettable counter drive gear 81 journalled on shaft 65 counterclockwise. Through its meshing engagement with drum drive gear 108 journalled on normally stationary drum shaft 109, gear 81 drives gear 108 in a clockwise direction around shaft 109 as indicated by the arrows in FIGURES 3 and 5. Gear 108 in its rotation carries with it the units drum 176 due to the interconnection provided by the extension portion 199 of pin 176 and the mating receiving opening 201 provided in gear 108. Registering movement of the various drums around shaft 109 is thus effected since the respective drums are respectively drivingly interconnected by their respective carryover gear rings 184 and 188 and the cooperating transfer pinions 203, 204 and 205 and their respective reset pawls 194 move around shaft 109 in a counterclockwise direction as viewed in FIGURE 7 so as to ratchet over their cooperating shaft recesses 195. In this way, the particular delivery in question is recorded on the resettable register drums of assembly 26 at the same time that the totalizer counters of assembly 24 accumulate the sum total of all individual deliveries.

Assumming an individual delivery is completed and it is desired to return the resettable drums of assembly 26 to zero registering position for the next delivery through operation of reset knob 122 journalled on one protruding end of shaft 109 (FIGURES 1 and 4). Resetting operation contemplates manual rotation of knob 122 clockwise as viewed from the left of FIGURES 1 and 4. Inititial resetting rotation effects relative clockwise movement of stub shaft 119 and reset cam plate 117 around shaft 109 and with respect to cam element 116 until the trailing ends of slots 127 engage pins 125 fixed to cam element 116. During this initial movement cam face 139 forces pawl 155 outwardly toward the periphery 136 of plate 117 resulting in clockwise rotation of pawl 155 and its mounting shaft 157 as viewed in FIGURE 3. This rotation of shaft 157 causes transfer pinion frame 213 (FIGURE 5) fixed thereto to swing clockwise away from shaft 109 and leaf spring arms 219 carried thereby to swing clockwise into engagement with the gear rings 184 and 189 of the resettable drums. As a consequence, the resettable drums are first freed from their transfer pinions and simultaneously frictionally held against rotation by arms 219 in their final registering position as detailed heretofore.

Continued rotation of knob 122 brings cam face 136 of plate 117 under nose 162 of pawl 155 to maintain the transfer pinions and arms 219 in their last mentioned position and through pins 125 picks up cam element 116 causing it and shaft 109 to which cam element 116 is fixed to move together with plate 117 in a clockwise direction. As a consequence, pawl 147 is forced outwardly from its engagement with cam element 116 toward the periphery of cam element 116 resulting in cam element 116, its integrally formed ratchet teeth 146 and shaft 109 being freed for clockwise ratcheting movement with respect to ratchet pawl 166 as will be clear from FIGURE 3. This movement of shaft 109 relative to the frictionally held resettable register drums 176, 177, 178 and 179, brings the spring biased drum mounted pick-up pawls 194 of non-zeroed drums into driving engagement with the driving wall of shaft recesses or notches 195 at the respective relative angular position determined by the registering position of the respective drums. In this connection, any zeroed drums will, like shaft 109, make a complete resetting rotation as knob 122 is continued in its resetting movement. Due to the interfering engagement between pawl nose 168 and teeth 146 of cam element 116, reverse movement of the reset mechanism and shaft 109 is prevented and unidirectional movement of knob 122, cam element 116 and shaft 109 in resetting direction until pawl 147 drops into the deepened portion of recess 141 to indicate, by rotational resistance, completion of the reset operation. Release of knob 122 at this time frees plate 117 to be overridingly driven by springs 133 into its normal rest position shown in FIGURE 3. It will be appreciated that upon reaching this position nose 162 of pawl 155 will have entered recess 137 of plate 117 permitting biasing spring 165 to reengage the transfer pinions and withdraw brake arms 219 from the ring gears of the resettable drums. It will be also be appreciated that the noncircular transfer pinion hubs 209 during disengagement of the pinions will have been swung into contact with brake blocks 229 as heretofore described to insure proper reengagement.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein..

What is claimed and desired to be secured by United States Letters Patent is:

1. In combination with a register mechanism having a series of totalizing drums and a set of resettable counter drums journalled on a respective drum shafts and a common drive shaft unidirectionally driven to effect registering rotation of said respective sets of drums: a drive and reset mechanism for said resettable counter drums comprising a one way drive connection between said common drive shaft and the initial resettable counter drum for effecting registering drive of said initial resettable counter drum; transfer pinion drive gearing interposed between said initial resettable counter drum and its adjacent succeeding counter drum and each of the other counter drums and its succeeding drum; and a reset mechanism comprising a lost motion drive connection one element of which is fixed to the drum shaft journalling said resettable counter drums and a second element of which is fixed to a reset shaft support for limited relative rotation with respect to said drum shaft journalling said resettable counter drums, said first element including a cam plate having a single pawl recess permitting unidirectional rotation of said element and its said drum shaft in the direction of registering rotation of said resettable counter drums and said second element including a cam plate having a single pawl recess permitting similar unidirectional movement of said last mentioned cam plate, a detent pawl normally biased toward said cam plate of said first element and engaged with its respective pawl recess to releasably secure said first element against rotational movement until said second element has completed its limited relative rotation, a second detent pawl normally biased toward said cam plate of said second element and engaged with its respective pawl recess to releasably secure said second element against rotational movement until resetting movement is imparted to it to cam said pawl out of its recess, shaft means rotatable with said second detent pawl and adapted upon initial movement of said second element to apply a braking force to said resettable counter drums and to disengage said transfer pinion drive gearing and engage said transfer pinion drive gearing with braking means, and reset knob means for manually rotating said second element to effect resetting of said resettable counter drums.

2. The combination of claim 1 wherein said cam plate of said first element is fixed to an end of said resettable drum shaft and has a gear wheel fixed to one face and headed mounting pins protruding from its other face for mounting the cam plate of said second element in adjacent face abutting relation, said cam plate of said second element has through slots therein receiving the shanks of said headed mounting pins and is fixed to a sleeve shaft journalled on the end of said resettable drum shaft and fixedly mounting a reset knob, spring anchor pins are mounted on said cam plate of said second element and tension springs fixed at their respective ends to respective spring anchor pins and respective head mounting pins are provided to bias said cam plate of said second element to an angular position such that the shanks of said mounting pins are normally engaged with the leading end of said through slots to assure an initial relative resetting rotation of said second element with respect to said first element to effect braking of said resettable counter drums and disengagement and braking of said pinion drive gearing before resetting movement of said resettable drums takes place.

3. The combination of claim 2 wherein said respective detent pawls are spring biased toward their respective cam plates so that entry of the detent pawls into their pawl recesses will determine the end of a full revolution of said resettable drum shaft to position its associated drums in their respective zero positions and signal the operator to release said reset knob.

4. The combination of claim 1 wherein the said second detent pawl is carried by a frame supported rock shaft and said shaft means comprises a support bracket fixed to swing in an arc upon rotation of said rock shaft, a resettable drum brake mechanism in the form of a multi-fingered spring plate fixed to said support bracket with its respective fingers extending into juxtaposition to a respective resettable drum, a transfer pinion shaft carried by said bracket in position to swing toward and away from resettable drums upon rotation of said shaft means.

5. The combination of claim 4 together with braking means for said transfer pinion drive gearing in the form of respective resiliently supported blocks positioned to yieldingly intercept respective pinions of said transfer pinion drive gearing upon swing movement of said transfer pinion shaft away from said resettable drums and hold said respective pinions against rotation thereby assuring proper meshing engagement of said respective pinions upon swing movement of said transfer pinion shaft toward said resettable drums to thereby assure proper interposition of said transfer pinion drive gearing between said resettable counter drums upon conclusion of the resetting of said drums.

6. A resettable counter drum mechanism for a register having a totalizer drum mechanism and a primary drive gear for driving said totalizer drum mechanism comprising a normally stationary counter drum shaft having a plurality of axially spaced and axially aligned notches in its periphery; means supporting said counter drum shaft with one end in adjacent relation to said primary drive gear; a plurality of counter drums journalled in side-by-side spaced relation along said counter drum shaft with a respective drum in adjacent relation to each of said shaft notches; a counter drum drive gear journalled adjacent said one counter drum shaft end and directly drivingly connected to the adjacent counter drum; unidirectional drive means interconnecting said primary drive gear and said counter drum drive gear to impart registering movement to said primary drive gear and its connected counter drum; reset pawls individual to and journalled on each counter drum and each having one end formed to be drivingly engaged by a respective counter drum shaft notch upon resetting rotation of said counter drum shaft; a driven reset cam plate fixed to said counter drum shaft adjacent its other end having a single pawl recess in its periphery; a reset shaft journalled on said other end of said counter drum shaft; a reset drive cam plate fixed to said reset shaft in face abutting relation to said driven reset cam plate, said drive cam plate having a single pawl recess in its periphery and a pair of diametrically opposed arcuate slots extending through its opposite side faces; a pair of headed connector pins fixed to said driven cam plate at diametrically opposed points with their respective shanks extending through said slots to secure said cam plates together against relative axial movement and for limited relative rotation; respective tension springs interconnecting said headed pins and said drive cam plate to bias said cam plates to a predetermined normal relative angular position to dispose said connector pins at the leading ends of said arcuate slots; respective frame mounted detent pawls having nose portions adapted to cooperate with the respective peripheral cam surfaces of said cam plates and the respective pawl recesses provided therein to prevent rotation of said cam plates from their said normal relative angular position in a direction other than that required for resetting said counter drums; transfer pinion gear means fixed to and rotatable with the frame mount of said reset drive cam plate pawl for movement into driving relation with respective adjacent counter drums when said reset drive cam plate pawl enters its cam plate recess to drivingly interconnect said counter drums and for opposite movement when said reset drive cam plate pawl moves out of said reset drive cam plate recess onto the peripheral cam surface during resetting rotational movement of said reset shaft and said reset drive cam plate; and means for rotating said drive cam plate.

7. The resettable counter drum mechanism of claim 6 together with a plurality of resilient finger members fixed to and rotatable with the frame mount of said reset drive cam plate pawl into frictional bearing engagement with said respective counter drums to yieldingly retain said counter drums against relative rotation with respect to said counter drum shaft upon initial and continued resetting rotational movement of said reset shaft and said reset drive cam plate.

8. The resettable counter drum mechanism of claim 6 together with a plurality of yieldingly supported braking blocks in juxtaposed relation to respective pinions of said transfer pinion gear means to frictionally engage said respective pinions to retain said pinions against rotation upon initial and continued resetting rotational movement of said reset shaft and said reset drive cam plate.

9. The resettable counter drum mechanism of claim 6 wherein said frame mount for said reset drive cam plate pawl comprises a shaft journalled in the frame of said mechanism and fixed to said reset drive cam plate pawl for rotation therewith, said counter drums at their opposite sides are each provided with a single tooth drive gear ring and a continuous tooth driven gear ring and said transfer pinion gear means comprises a bracket fixed to said shaft and having a pair of generally radially extending, axially spaced arms having oppositely aligned openings therein disposed on an axis paralleling said counter drum shaft, a transfer pinion shaft supported in said aligned openings, and a plurality of transfer pinions each journalled on said pinion shaft with their respective hubs in end abutting relation to locate said transfer pinions in operative axially related position to drivingly connect adjacent pairs of unlike counter drum gear rings, said reset drive cam plate pawl upon initial reset movement of said reset drive cam plate being adapted to swing around the axis of and rotate said frame journalled shaft and its relatively fixed bracket thereby disengaging said transfer pinions from said counter drum gear rings to condition said counter drums for resetting upon further reset movement of said reset drive cam plate.

10. A totalizing and resettable counter fluid delivery register comprising a frame having a base and an upstanding pair of spaced side walls; an input drive shaft extending upwardly through said base; a main drive shaft journalled between said spaced side walls; gear means drivingly connecting said input drive shaft and said main drive shaft; a totalizing drum assembly including a support shaft the opposite ends of which are supported by said frame and a series of adjacently related counter drum and carryover transfer gear assemblies journalled on said support shaft; drive gearing drivingly connecting said main drive shaft and one of said counter drums; a combined reset and resettable counter drum support shaft journalled in said frame side walls with one end projecting beyond one of said frame side walls; a series of resettable counter drums and a counter drum drive gear journalled on said last mentioned support shaft; unidirectional drive means drivingly connecting said main drive shaft and said counter drum drive gear to drive said drive gear in a registering direction and permit said drive gear to overrun said main drive shaft during resetting of said series of resettable counter drums; means connecting said counter drum drive gear and the adjacent counter drum for unitary rotation; shiftable carryover pinions normally drivingly interconnecting said series of resettable counter drums; unidirectional pawl drive means between each of said resettable counter drums and said combined reset and resettable counter drum support shaft arranged to rotate said series of resettable counter drums and said counter drum drive gear in registering direction upon resetting rotational movement of said combined reset and resettable counter drum support shaft; and reset hand wheel actuating means mounted on the protruding end of said combined reset and resettable counter drum shaft including an element fixed to said shaft, a cam element journalled on said shaft, a lost motion connection between said elements and a shifter pawl journalled in said one frame side wall and operatively supporting said shiftable carryover pinions, said reset hand wheel actuating means upon imparting resetting movement thereto first providing relative movement of said cam element and said reset shaft and said element fixed thereto to swing said pawl in a direction to disengage said shiftable carryover pinions and thereafter providing unitary movement of said reset shaft and said element fixed thereto with said cam element to effect a complete revolution of said shaft and actuation of said unidirectional pawl drive means to rotate said resettable counter drums to their zero registering position.

11. In a fluid delivery register comprising a totalizing counter drum mechanism, a shaft supported carryover pinion type resettable counter drum mechanism, a common drive shaft and unidirectional drive means for driving the resettable drum mechanism, a reset mechanism comprising hand wheel actuating means supported by the support shaft of said resettable counter drum mechanism and including an element non-rotatably fixed to said support shaft, a cam element journalled on said support shaft adjacent said fixed element, a lost motion connection connecting said elements and adapted to permit relative movement of said cam element and said support shaft and its non-rotatably fixed element upon initial resetting movement of said reset mechanism, pawl means journalled on said register and mounting said carryover pinions of said resettable counter drum mechanism for swinging movement between engaged and disengaged relation with said resettable counter drums upon relative rotation of said cam element and pawl means individual to said resettable counter drums and adapting said counter drums for resetting rotation upon resetting rotation of said support shaft as said cam element, said fixed element and said support shaft rotate as a unit upon continued rotation of said cam element.

12. The combination of claim 11 wherein said fixed element is a cam element and there is provided a second pawl means journalled on said register and cooperating with said fixed cam element to signal the reset zero position of said resettable drums reached upon one complete revolution of said support shaft.

13. The combination of claim 11 wherein said lost motion connection includes spring means arranged to effect retrograde relative movement of said journalled cam element and fixed element during said resetting operation to position said cam element to permit reengagement of said carryover pinions and said resettable counter drums for recording the next successive delivery.

14. The combination of claim 11 wherein said first mentioned pawl means includes leaf spring means swingable into engagement with said resettable counter drums during the initial relative movement of said cam element to retain said counter drums against free relative rotation upon disengagement of said carryover pinions.

15. The combination of claim 14 together with spring supported braking blocks positioned to brakingly cooperate with said carryover pinions during their initial disengaging movement and so long as they are disengaged to retain said carryover pinions against free relative rotation while they are disengaged.

References Cited in the file of this patent

UNITED STATES PATENTS

| | | |
|---|---|---|
| 1,506,939 | Pankonin | Sept. 2, 1924 |
| 1,875,060 | Long | Aug. 30, 1932 |
| 1,980,232 | Syle | Nov. 13, 1934 |
| 2,140,839 | Hennessy | Dec. 20, 1938 |

FOREIGN PATENTS

| | | |
|---|---|---|
| 207,090 | Australia | Mar. 21, 1957 |